United States Patent
Wood

(10) Patent No.: US 8,343,293 B2
(45) Date of Patent: Jan. 1, 2013

(54) CAST ART

(76) Inventor: Tracie Diane Wood, Adrian, MI (US)

(*) Notice: Subject to any disclaimer, the term of this patent is extended or adjusted under 35 U.S.C. 154(b) by 191 days.

(21) Appl. No.: 12/214,005

(22) Filed: Jun. 16, 2008

(65) Prior Publication Data

US 2009/0107615 A1    Apr. 30, 2009

Related U.S. Application Data

(60) Provisional application No. 61/000,776, filed on Oct. 29, 2007.

(51) Int. Cl.
B32B 37/14 (2006.01)

(52) U.S. Cl. .................. 156/86; 428/195.1; 401/198

(58) Field of Classification Search .............. 156/84, 156/85, 86; 428/195.1, 34.9
See application file for complete search history.

(56) References Cited

U.S. PATENT DOCUMENTS

| | | | |
|---|---|---|---|
| 2,790,285 A | | 4/1957 | Snyder et al. |
| 3,329,143 A | * | 7/1967 | Gordon .................. 602/3 |
| 3,604,584 A | | 9/1971 | Shank, Jr. |
| 4,923,557 A | * | 5/1990 | Dickey ................. 156/86 |
| 4,927,025 A | * | 5/1990 | Thompson et al. ........ 206/575 |
| 5,070,630 A | | 12/1991 | Edmundson |
| D395,087 S | | 6/1998 | Devries |
| D484,604 S | | 12/2003 | Tramel et al. |
| 7,066,899 B2 | | 6/2006 | Baron |
| 7,314,457 B2 | | 1/2008 | Reaux |
| 2001/0002605 A1 | | 6/2001 | Morawski et al. |
| 2004/0118503 A1 | * | 6/2004 | Record ................. 156/85 |
| 2005/0161145 A1 | | 7/2005 | Record |
| 2009/0053451 A1 | * | 2/2009 | Smith ................. 428/42.1 |

FOREIGN PATENT DOCUMENTS

| | | | |
|---|---|---|---|
| EP | 358451 A1 | * | 3/1990 |
| JP | 52060873 | | 5/1977 |
| TW | 589256 | | 6/2004 |

OTHER PUBLICATIONS 3M, 3M Adhesive Transfer Tape 9428PC, 2012, www.solutions.3m.com, Product Catalog Description.*
U.S. Appl. No. 12/783,439 Office Action, dated Jun. 19, 2012.
U.S. Appl. No. 12/889,137 Office Action, dated Jun. 1, 2012.
U.S. Appl. No. 12/889,137 Office Action, dated Nov. 14, 2011.
U.S. Appl. No. 12/783,439 Office Action, dated Nov. 14, 2011.
www.casttoo.com Jessica Smith Boulder, Colorado, 2008.
Webaddress: www.parknicollet.com/stores/ProductDetail.cfm?productid=CASTKI8807680 Crazy Cast™ Cast Decorating Kit, 2008.
Zula™ Decorative Cast Cover www.selectmedproducts.com/castcover.html, 2008

* cited by examiner

*Primary Examiner* — Khanh P Nguyen
*Assistant Examiner* — Margaret Squalls
(74) *Attorney, Agent, or Firm* — Kunzler Law Group, PC

(57) ABSTRACT

A portfolio of components and a method for creating an embellishment for an orthopedic cast comprising a shrink-film in a sleeve like configuration that conforms to the cast in a substantially circumferential relationship and the shrink-film having at least one decoration.

14 Claims, 3 Drawing Sheets

CAST ART

This patent application claims benefit of U.S. Provisional Patent Application No. 61/000,776 filed Oct. 29, 2007, entitled Cast Art.

TECHNICAL FIELD OF INVENTION

The invention relates to an embellishment of an orthopedic cast that surgeons, medical doctors, veterinarians, and/or other medical technicians and professionals use to treat injured bones, joints, and surrounding soft tissue in humans or in animals. The embellishment involves use of shrink-film polymer materials to decorate the cast, and the shrink-film usually has pre-printed markings one applies by various common processes, by hand and/or machine.

BACKGROUND

Packagers have used shrink-film polymers for many years to wrap products. Common films use polyolefin polymer, such as, polypropylene or polyethylene, or polyvinyl chloride (PVC) polymer. Other shrink-film polymers include polystyrene and glycol-modified polyester. Recently, packagers have begun to consider biodegradable polymers, such as film based on polylactic acid. The shrink-film helps protect products from damage and contamination during handling and shipment, prevent loss of bundled components from theft, or to indicate product tampering. A distinguishing characteristic of shrink-film is its ability upon exposure to a level of heat energy to shrink or create shrink-tension within the film if it is restrained. Examples of wrapped items include: cans, jars, bottles, compact disk recordings, toys, food products, gift baskets, household items, hardware components, and the like.

Containers, such as bottles and jars, generally have a closure that seals contents within the container. Applying an adhesive, such as a pressure sensitive rubberized adhesive, to one side of the shrink-film creates a heat shrinkable film tape that packagers wrap around the closure and then shrink to make a secondary closure. Similarly, packagers make the secondary closure by creating a pre-made heat shrinkable sleeve, some open only at one end, which slides over the closure and then is heat-shrunk. This secondary closure can provide indication of product tampering and helps keep the closure and adjacent areas of the bottle or jar substantially free of contamination.

Packagers pre-decorate shrink-films as means for labeling the bottle or jar. A shrink-film label is generally made of a special shrink-film polymer material that shrinks mostly in a transverse direction than in an axial direction of the bottle or jar.

For decades, medical professionals have treated injured bones, joints, and surrounding soft tissue using the orthopedic cast made in part of plaster based structural materials and more recent fiberglass based structural materials that harden to thereby substantially immobilize and support the injured area. Typically, medical professionals apply casts to limbs and torsos. Depending on the injury, injury treatment and use of the cast can take a period of a few weeks to several months. On average, these professionals will treat over 9.8 million U.S. residents each year; many are children or animals important to children.

In practice, medical professionals apply a padding covering the injured area before applying the structural material. The padding is usually white in color and traditionally the structural material is white in color, but occasionally has a pigment in one of a few other select colors.

Because these casts are temporary, often replaced during the period of treatment, patients and their friends, relatives, and other individuals often decorate the cast with any number of drawings, sketches, slogans, hieroglyphics, phrases, comments, poetry, symbols, and the like. Children are particularly interested in decorating their casts and parents usually encourage this interest in that it creates an activity that is fun for them and may partly distract them from otherwise often traumatic issues associated with treatment. Psychologically, the decorations can become a badge of honor.

Until this invention, individuals apply decorations directly to the cast's structural material using felt-pens, ballpoint pens, brushes, or other similar marking means that use ink, paint, or pencil lead. Once applied, the decoration remains until cast removal. Sometimes decorations applied later become inappropriate. Sometimes the cast becomes soiled. Other times cast decorations may become a memento.

Accordingly, an intention of the invention is to decorate orthopedic casts in a novel manner that creates applied decorations that can partially distort in interesting ways during application of heat energy and subsequent contraction of shrink-film.

Another intention of the invention is to enable individuals to readily alter, remove, or hide at will cast color and/or previously applied decorations.

Another intention of the invention is to help enable individuals to maintain a fresher and cleaner cast appearance.

Another intention of the invention is to provide means that may enable parents and medical professionals to help children ease, often traumatic, issues associated with treatment.

Another intention of the invention is to enable individuals to transfer decoration applied to a previous cast if medical professionals determine treatment requires a replacement cast.

Another intention of the invention is to provide a portfolio of selected components that will enable individuals to apply initial cast decorations and to readily exchange previously applied decorations.

From description, appended claims, and accompanying drawings that follow, additional benefits and advantages of the present invention will become apparent to those skilled in art to which this invention relates.

SUMMARY OF INVENTION

A portfolio of embellishing components for an orthopedic cast comprising: a quantity of shrink-film materials in a form that is at least one of an individual sheet, a continuous roll, and a pre-made sleeve. The portfolio has at least one of a marking instrument adapted to mark the shrink-film material in at least one color and a shrink-film decoration. The decoration can be a printing on the shrink-film material. The portfolio of embellishing components can further comprise a quantity of heat-shrinkable adhesive tape in a shape that is at least one of a continuous roll and a pre-cut strip. At least one of the quantity of heat-shrinkable adhesive tape of the portfolio of embellishing components can have a surface gloss finish, a surface matt finish, a pigment, be transparent, be translucent, be clear, and be opaque. At least one of the shrink-film materials can have a surface gloss finish, a surface matt finish, a pigment, be transparent, be translucent, be clear, and be opaque. The pre-made sleeve in cross-section can have a circumference that approximates a peripheral distance around the cast, particularly for casts for treating limbs. The marking instrument can be a plurality of marking instruments each adapted to mark the shrink-film materials in a different color. The marking instrument can be a felt-pen like instrument.

A method for embellishing an orthopedic cast comprising steps of: selecting from a portfolio of components specific components for embellishing the cast. Surrounding a portion of the cast with a shrink-film material an individual selects from the portfolio of components. The shrink-film material has at least one decoration. Applying sufficient heat to cause the shrink-film material to contract thereby establish a conforming circumferential relationship with the cast. The method can further comprise a step of applying the decoration to the shrink-film material with at least one marking instrument before applying the heat. The method can further comprise a step of applying a heat-shrinkable adhesive tape to the shrink-film material. The shrink-film material has an overall surface, at least one edge, and at least one surface-area adjacent to the edge. Applying the heat-shrinkable adhesive tape to the surface-area adjacent to the edge and at least one of a portion of the overall surface and another surface-area adjacent to another edge to fashion a joint thereby establishing a substantially sleeve like configuration of the shrink-film material for surrounding the cast. The step of applying sufficient heat can involve use of a handheld hot-air hairdryer like device. The method can further comprise a step of applying a second layer of the shrink-film material over a first layer of the shrink-film material.

An embellishment for a cast comprising: a shrink-film in a sleeve like configuration that conforms to the cast in a substantially circumferential relationship and the shrink-film having at least one decoration.

DETAILED DESCRIPTION

Figure 1:
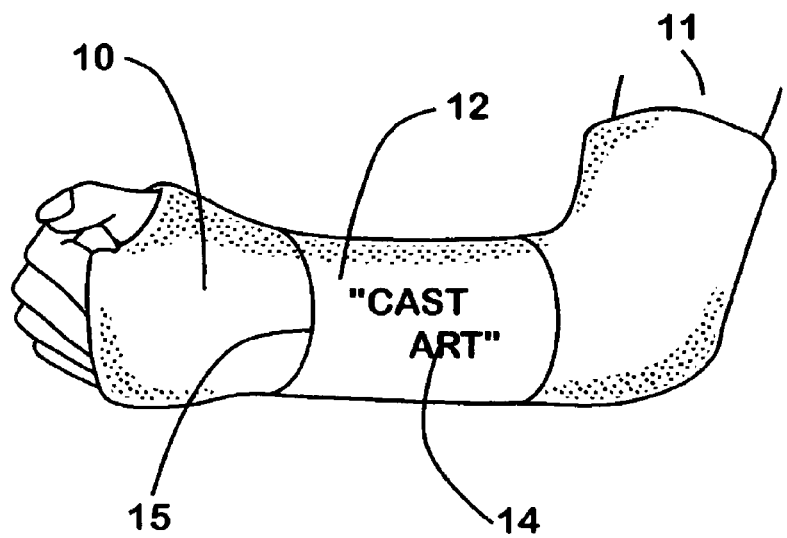
FIG. 1 is a perspective view of an orthopedic cast having a shrink-film material embellishment.

FIG. 1 illustrates a typical orthopedic cast 10 for an arm 11 of a human. Medical professionals treat injured bones, joints, and surrounding soft tissue of humans and animals using the orthopedic cast 10 made in part of plaster based structural materials, and more recent fiberglass based structural materials that harden to thereby substantially immobilize and support the injured area. While FIG. 1 illustrates the arm 11, it is apparent that medical professionals use casts 10 for immobilizing other limbs as well as other body parts.

Because these orthopedic casts 10 are temporary, often replaced during the period of treatment, patients and their friends, relatives, and other individuals often directly adorn the cast 10 with any number of drawings, sketches, slogans, hieroglyphics, phrases, comments, poetry, symbols, and the like (not illustrated). FIG. 1 shows a novel approach to adorn the cast 10 without necessarily marking or creating renderings on the cast 10 directly. This novel way involves covering a portion of the cast 10 with a shrink-film material 12 having a decoration 14 and causing the shrink-film material 12 and its decoration 14 to establish a circumferentially conforming relationship 15 with the cast 10. Manufacturers of shrink-film material 12 sometimes refer to shrink-film material 12 as shrink wrap and occasionally as stretch film or stretch wrap.

Figure 2:
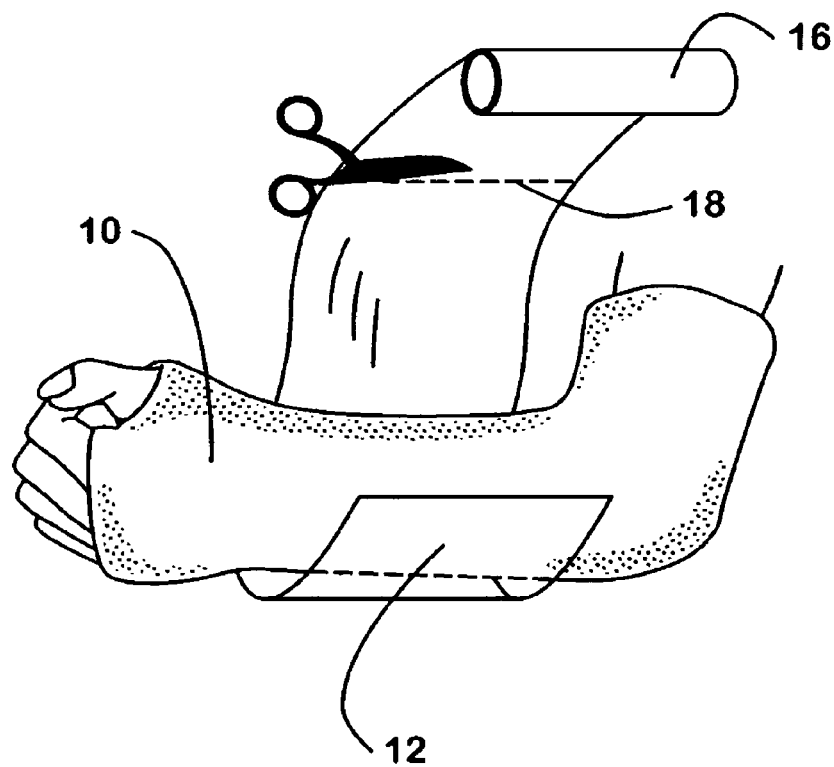
FIG. 2 is a perspective view of the orthopedic cast with a roll of shrink-film material.
Figure 3:
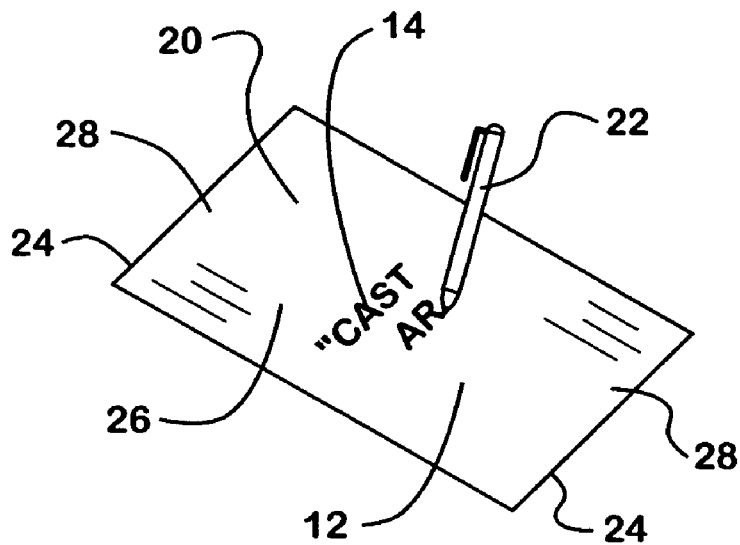
FIG. 3 is a perspective view of a sheet of the shrink-film material and a decoration.

Cast 10 has a circumference or a peripheral distance of some dimension that is slightly different for each specific orthopedic treatment application. Moreover, the circumference or peripheral distance is likely different at one end of the cast 10 from another end. FIG. 2 illustrates cutting along a line 18 a quantity of shrink-film material 12 from a roll 16 sufficient to wrap around cast 10 somewhat snugly thereby substantially shaping the shrink-film material 12 into a sleeve 19 configuration (see FIG. 4). This quantity of shrink-film material 12, when substantially flat, forms a sheet 20 (see FIG. 3) having an overall surface 26, at least one edge 24, and a surface-area 28 adjacent to the edge 24. In a preferred embodiment, using a marking instrument 22, patients and their friends, relatives, and other individuals can create or render the shrink-film decoration 14 with relative ease directly onto the overall surface 26 of shrink-film material 12 while it remains flat.

Figure 4:
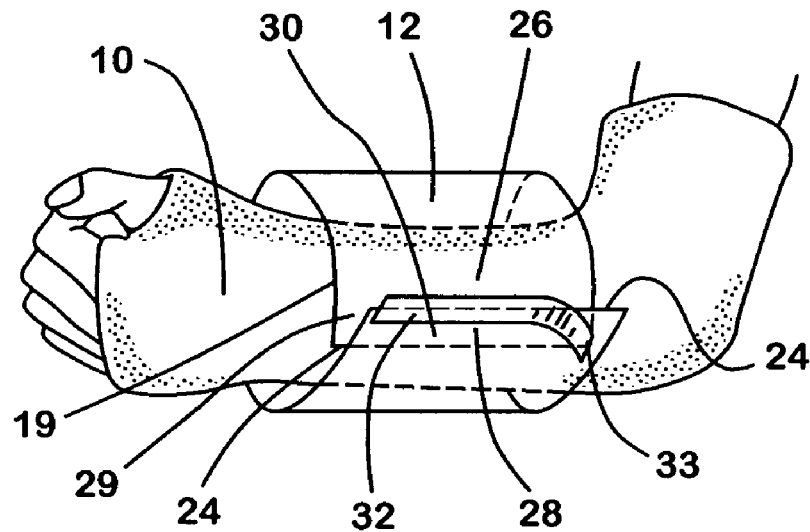
FIG. 4 is a perspective view of the orthopedic cast receiving the sheet of shrink-film material further illustrating a preferred embodiment where edges of the shrink-film material overlap and a strip of heat-shrinkable adhesive tape for securing the edges.

In FIG. 4 edges 24, in the preferred embodiment, slightly overlaps at vicinity 29. The patient and their friends, relatives, and other individuals will cut shrink-film material 12 along line 18 such that the shrink-film material 12 will approximate the peripheral distance around the cast 10. A strip of a heat-shrinkable adhesive tape 32 engages with one surface-area 28 adjacent to the edge 24 with a portion of the overall surface 26 to fashion an overlapping-joint 30 thereby completing construction of sleeve 19 around cast 10. Construction of sleeve 19 with overlapping-joint 30 allows minor fit adjustments to the shrink-film material 12 around the cast 10 to easily accommodate cast 10 at places having different peripheral distance dimensions without making additional cuts to the shrink-film material 12 in order to fine-tune its size. Furthermore, allowing easy snug construction of sleeve 19 speeds the approach for adorning or embellishing cast 10 while minimizing shrink-film material 12 contraction to thereby establish the conforming relationship 15 with cast 10.

Figure 5:
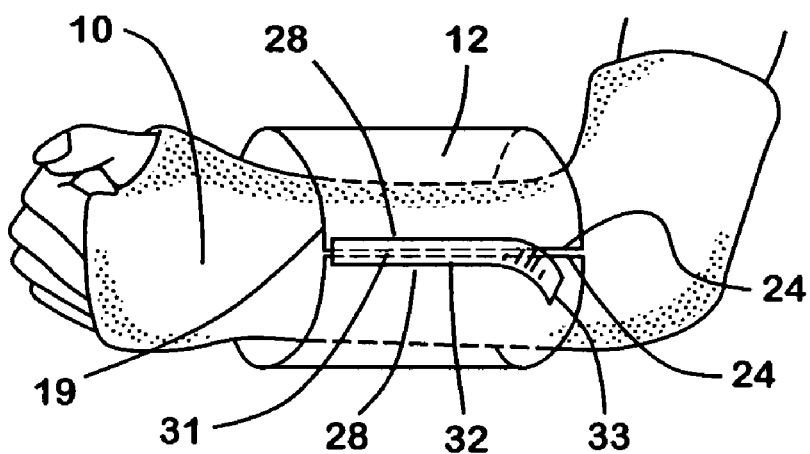
FIG. 5 is a perspective view similar to FIG. 4 illustrating an embodiment where edges of the shrink-film material are substantially adjacent to each other.

FIG. 5 shows an alternative approach to that shown in FIG. 4. In this alternative, the patient and their friends, relatives, and other individuals cut the shrink-film material 12 so that edges 24 establish a bridge joint 31 without overlap. The strip of the heat-shrinkable adhesive tape 32 engages two surface-areas 28 adjacent to respective edges 24 to fashion the bridge joint 31 between the two edges 24. The alternative approach requires more time to trim and thereby initially fit shrink-film material 12 around cast 10. Portion 33 shown in FIG. 4 and FIG. 5 of the heat-shrinkable tape 32 normally is in full contact with shrink-film material 12. FIG. 4 and FIG. 5 shows the strip of heat-shrinkable adhesive tape 32 as partially engaged at portion 33 with shrink-film material 12 to respectively better illustrate features of overlapping joint 30 and bridge joint 31. The heat-shrinkable adhesive tape 32 can be a quantity in a shape of a roll (not illustrated) from which the patient and their friends, relatives, and other individuals cut strips and/or a quantity in a shape of pre-cut strips.

Figure 6:
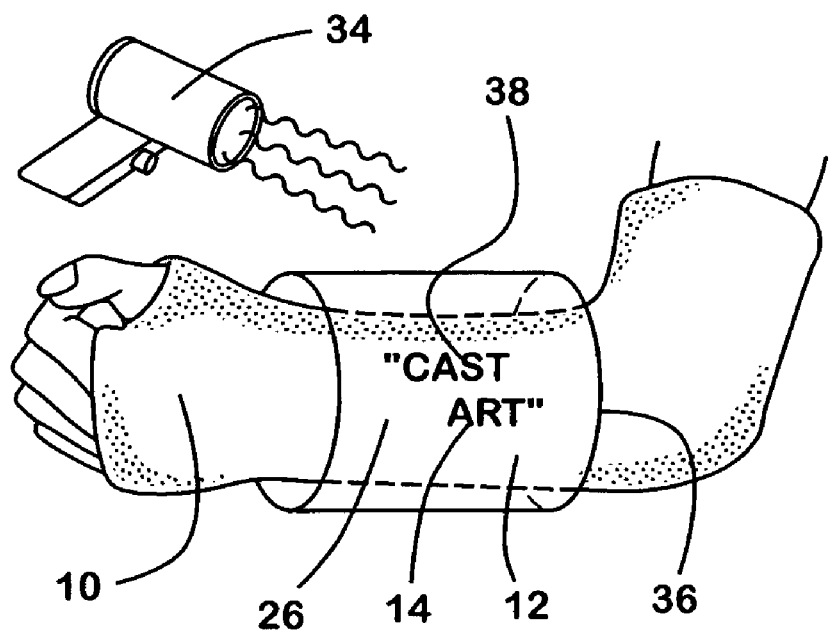
FIG. 6 is a perspective view of the orthopedic cast with the shrink-film material around the cast before an application of heat energy.

Causing the shrink-film material 12 to establish the circumferentially conforming relationship 15 with the cast 10 requires an application of heat energy from a heat source 34, FIG. 6. While shrink-film material 12 can have tailored performance parameters, such as a greater degree of shrinkage in one direction over another or reduced shrinkage in all directions, general-purpose material suitable for embellishing cast 10 will contract in uniaxial substantially perpendicular directions typically up to approximately 60% of its original size, perhaps more for some polymers. Nonetheless, using a tailored shrink-film polymer that shrinks mostly in a transverse direction than in an axial direction may be useful in certain cast 10 adornment applications.

Shrink-film material 12 is typically a thermoplastic polymer such as polyolefin (that is, polyethylene, polypropylene) or polyvinyl chloride or other polymer materials. Manufactures produce shrink-film material 12 by a number methods generally involving biaxially stretching or orientating the polymer's molecular structure quickly followed by a rapid cooling while restrained in its stretched condition to substantially freeze the polymer's molecular structure in the stretched state. Heat energy from the heat source 34 causes the shrink-film material 12, that is, its stretched or oriented molecular structure, to release thereby generally return the polymer to substantially to its original un-stretched state.

Releasing this frozen molecular structure of common shrink-film material 12 requires relatively little heat energy, up to approximately 200° F. (38° C.). Accordingly, the heat source 34 is likely a handheld heat gun specifically for use with shrink-film material; however, the patient and their friends, relatives, and other individuals will likely use a common handheld hot-air hairdryer or the like. Other heat guns for use with paint stripping produce too much heat, therefore, risk damaging the shrink-film material 12, the cast 10, and harming the patient.

Likewise, the heat-shrinkable adhesive tape 32 is a form of shrink-film material 12 adapted with typically a pressure sensitive rubber resin coating applied to one side.

Figure 7:
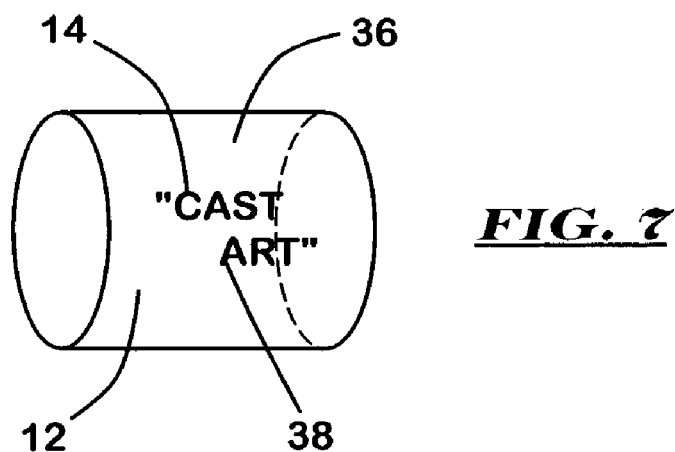
FIG. 7 is a perspective view of a pre-made sleeve embodiment of the shrink-film material.

FIG. 7 illustrates an alternative configuration of shrink-film material 12 as a pre-made sleeve 36. This pre-made sleeve 36 can be a tube without a seam. Alternately, pre-made sleeve 36 may have a joined structure wherein two ends of the shrink-film material in the sheet 20 form are pre-attached by some means perhaps similar to the overlapping joint 30 or bridge joint 31 using an adhesive or pre-attached with a polymer welding process. The circumference of the pre-made sleeve 36 must approximate the peripheral distance of cast 10. If too large, shrink-film material 12 in pre-made sleeve 36 may not contract sufficiently to establish the necessary circumferential conforming relationship 15 with orthopedic cast 10.

Figure 8:
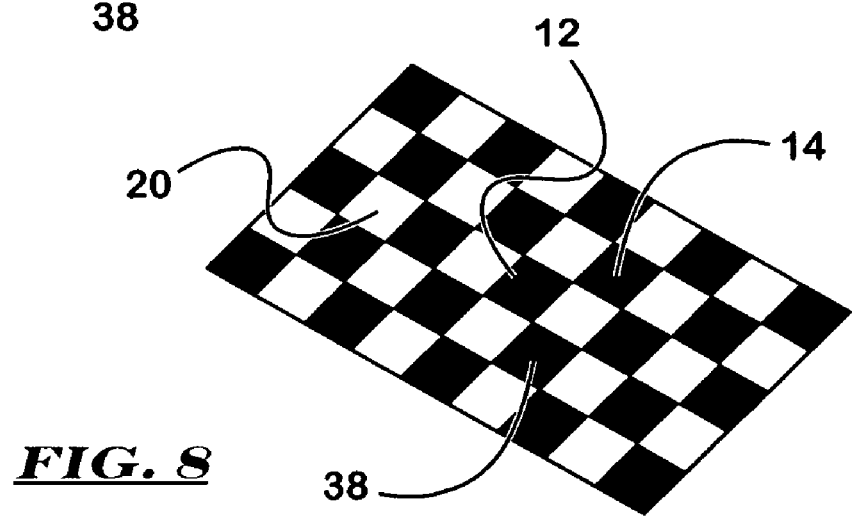
FIG. 8 is a perspective view similar to FIG. 3 illustrating an embodiment where the decoration is a printing on the shrink-film material.

FIG. 8 illustrates an alternative where the shrink-film decoration 14 of is a printing 38. Generally, others apply this printing 38 to shrink-film material 12 beforehand by any of a number of common processes including digital-printing processes. While the specific decoration 14 illustrated in FIG. 8 is a "checker board" rendering, the shrink-film decoration 14 can be of any rendering limited only by imagination. Examples of shrink-film decorations 14, without limiting scope, can include: heart configurations for Valentine's Day, happy faces, stripes to simulate a candy cane at Christmas time, plaids similar to those Scotts use to distinguish clans, typical tattoo art, famous logos (with appropriate license) such as those of, Coca-Cola®, Harley Davison®, Ford®, Chevrolet®, Walt Disney®, and the like.

Furthermore, decoration or shrink-film decoration 14 is not limited solely to markings or renderings on the shrink-film materials 12, but also includes adornments or embellishments that alter cast 10 surface texture via use of shrink-film materials 12, such as, alterations in surface gloss and color. While the polymers of many shrink-film materials 12 and heat-shrinkable adhesive tapes 32 are water clear transparent with high glossy surface finish, modifications to these polymers during manufacture may allow other alternatives. The shrink-film material 12 and heat-shrinkable adhesive tape 32 may have a surface gloss finish, a surface matt finish, and a pigment. The pigment may be a light tint that maintains a transparent or a translucent character to the shrink-film material 12. Alternatively, the pigment in certain polymer formulations may cause the shrink-film material 12 and heat-shrinkable adhesive tape 32 to become opaque. Opaque shrink-film materials 12 may be useful to conceal markings previously applied directly to cast 10. Of course, the shrink-film decoration 14 may be a combination of one or more: printings 38, renderings with marking instrument 22, changes in transparency, changes in surface gloss, and changes in color.

In the preferred embodiment, marking instrument 22 the patient and their friends, relatives, and other individuals use is a felt-pen like instrument. The felt-pen has a point made of felt or a similar compressed fiber that allows ink to flow as the point travels across the overall surface 26 of shrink-film material 12. Moreover, felt-pens are available in a number different colors and point sizes that allows for unique renderings. Other marking instruments 22 having a ballpoint configuration or use a graphite polymer pencil lead, paint or the like may be appropriate. An important characteristic or quality of the markings is that the marking or rendering must be relatively permanent readily adhering to the shrink-film material 12 and withstand contraction during the application of heat energy with heat source 34. The patient and their friends, relatives, and other individuals understand that any adornment applied to the shrink-film material 12 will slightly distort from subsequent contraction that establishes the conforming relationship 15 of shrink-film material 12 with cast 10.

Shrink-film materials 12 have two sides with a topside surface and an underside surface (not illustrated). Printings 38 that are part of decoration 14 can be on the underside in direct contact with the cast 10. In this way, the shrink-film material 12, particularly if transparent, allows viewing while it provides a layer of protection to the decoration 14 from damage possible from normal wear and tear. Printings 38 on the underside of shrink-film material 12 is a particularly useful approach when using the pre-made sleeve 36 perhaps in a narrow band with, for example, tattoo art or famous logo renderings.

On the other hand, markings made with the marking instrument 22 are likely on the topside surface of the shrink-film material 12 because the patient and their friends, relatives, and other individuals may not have skills necessary to create markings in reverse that become part of decoration 14. Accordingly, markings or renderings on the topside surface of shrink-film material 12 may be more prone to damage. Consequently, the patient and their friends, relatives, and other individuals may choose to add or overlay a second sleeve 19 or pre-made sleeve 36 transparent or translucent for additional protection of these topside renderings.

I created prototype orthopedic cast 10 embellishments with excellent results using ATW Crystal Clear™ #501 Shrink Wrap Film, 150 Gauge, 10 inches wide roll, a polyvinyl chloride (PVC) polymer film manufactured and supplied by ATW Manufacturing Company Inc., Eugene, Oreg., for the shrink-film material 12. The ATW Crystal Clear™ #501 Shrink Wrap Film is water clear with surface gloss finish.

I used Sanford® Brand Sharpie® felt-pens in various colors to create several multicolor test renderings as part of shrink-film decoration 14 directly on the ATW Crystal Clear™ #501 Shrink Wrap Film. The Sharpie® felt-pen is manufactured by Newell Rubbermaid Company, Atlanta, Ga.

I used Scotch® brand Heat Shrinkable Film Tape, #6887 Paklon™ having a shrink-film PVC backing and a synthetic rubber resin adhesive, manufactured by 3M Company, St. Paul, Minn. to construct the sleeve 19 using the overlapping joint 30. The Scotch® brand Heat Shrinkable Film Tape, #6887 Paklon™ tape is water clear with surface gloss finish and has a ¾-inch width.

I used a common small personal handheld hot-air hair dryer as the heat source 34 that proved an excellent means for establishing a smooth relatively tight and secure conforming relationship 15 of the ATW Crystal Clear™ #501 Shrink Wrap Film and Scotch® brand Heat Shrinkable Film Tape, #6887 Paklon™ tape with cast 10. The test renderings distorted slightly as was expected when the ATW Crystal Clear™ #501 Shrink Wrap Film and Scotch® brand Heat Shrinkable Film Tape, #6887 Paklon™ tape contracted against cast 10, but were not otherwise damaged.

During my research, I discovered that the ATW Crystal Clear™ #501 Shrink Wrap Film and Scotch® brand Heat Shrinkable Film Tape, #6887 Paklon™ tape allowed me to easily remove the shrink-film decoration 14 from cast 10 and reapply to another cast 10 of similar size and shape. The ability to easily remove the decoration 14 is an advantage in that it allows the patient to reapply the decoration 14 to another cast 10 if medical professionals replace cast 10 during treatment. The ATW Crystal Clear™ #501 Shrink Wrap Film and Scotch® brand Heat Shrinkable Film Tape, #6887 Paklon™ tape retain, within limits, additional capability to shrink and re-establish the conforming relationship 15. Moreover, the synthetic rubber resin adhesive remains sufficiently active to permit re-establishment of the overlapping joint 30 and bridge joint 31. Of course, the heat-shrinkable adhesive tape 32 is removable allowing reapplication of a fresh strip of heat-shrinkable adhesive tape 32. Secondly, easily removal allows the patient to retain the decoration 14 as a memento once treatment ends.

Sales and marketing of products to embellish the orthopedic cast 10 involves establishing a collection or portfolio of embellishing components from which the patient and their friends, relatives, and other individuals can select specific items or restock portfolio items previously used. This portfolio includes shrink-film material 12 and marking instrument 22 to allow the patient and their friends, relatives, and other individuals to create renderings that add to and become part of decoration 14 on the shrink-film material 12 and/or other shrink-film decorations 14 involving printings 38 and/or changes in color, tint, and/or surface texture. Shrink-film 12 can be in individual sheets 20 precut into typical sizes suitable for common orthopedic treatments, in roll 16 form allowing the patient and their friends, relatives, and other individuals to custom size a number of the sheets 20, and/or pre-made sleeves 36 also in sizes suitable for common orthopedic treatments. The portfolio further includes heat-shrinkable adhesive tape 32 to allow the patient and their friends, relatives, and other individuals to construct sleeve 19 from sheets 20. The heat-shrinkable adhesive tape 32 can be in roll form (not illustrated) from which the patient and their friends, relatives, and other individuals cut individual strips and/or pre-cut strips of corresponding size to shrink-film material 12 that is part of the portfolio. The portfolio can include a storage container, such as a box or the like (not illustrated) perhaps having specialized compartments for various embellishing components; however, the portfolio is the collection of embellishing components not the box or other container with components held therein.

From forgoing description of the preferred embodiment and certain alternatives, additional benefits and advantages of the present invention will become apparent to those skilled in art to which this invention relates; moreover, one must understand that other variations are feasible that do not depart from the invention and its scope and spirit as defined by appended claims.

I claim:

1. An apparatus comprising:
   a sheet of shrink-film material having a first edge and an opposing second edge;
   a heat-shrinkable adhesive tape for connecting the first edge with the opposing second edge such that the sheet forms a sleeve;
   an orthopedic cast;
   the shrink-film material configured to be disposed around the orthopedic cast; and
   a plurality of colored marking instruments for placing markings on the shrink-film material, the plurality of colored marking instruments comprising a plurality of different colors,
   wherein the shrink-film material comprises a surface configured to retain a marking from one or more of the plurality of colored marking instruments.

2. The apparatus of claim 1, wherein the shrink-film comprises a printed decoration.

3. The apparatus of claim 1, wherein the heat-shrinkable adhesive tape is in the shape of a continuous roll or a pre-cut strip.

4. The apparatus of claim 3, wherein the heat-shrinkable adhesive tape is formed having at least one of a surface gloss finish, a surface matt finish, or a pigment, and wherein the heat-shrinkable adhesive tape is one of transparent, translucent, or opaque.

5. The apparatus of claim 1, wherein the sheet of shrink-film material is formed having at least one of a surface gloss finish, a surface matte finish, or a pigment, and wherein the sheet of shrink-film material is one of transparent, translucent, or opaque.

6. The apparatus of claim 1, wherein the sleeve has a circumference greater than a peripheral distance around the orthopedic cast.

7. The apparatus of claim 1, wherein each marking instrument of the plurality of marking instruments is selected from the group consisting of a felt-tip pen, a ballpoint pen, and a pencil.

8. A method comprising:
   providing a sheet of shrink-film material having a first edge and an opposing second edge;
   disposing the sheet of shrink-film material around an orthopedic cast by connecting the first edge with the opposing second edge with a heat-shrinkable adhesive tape such that the sheet forms a sleeve;
   applying a marking to a surface of the shrink-film material with at least one colored marking instrument, wherein the surface retains the marking; and
   applying sufficient heat to cause the shrink-film material to contract and engage the orthopedic cast.

9. The method of claim 8, further comprising applying the marking to the shrink-film material before applying the heat.

10. The method of claim 8, further comprising applying sufficient heat by directing the hot air of a hairdryer towards the sheet of shrink-film material.

11. The method of claim 8, further comprising applying at least a second layer of the shrink-film material over the sleeve.

12. The method of claim 8, wherein the shrink-film decoration comprises a pre-printed decoration.

13. The method of claim 8, wherein the marking instrument is selected from the group consisting of a felt-tip pen, a ballpoint pen, and a pencil.

14. A method comprising:

providing a sheet of shrink-film material having first edge and an opposing second edge;

wherein the sheet of shrink-film material has a colored shrink-film decoration printed on a surface of the shrink-film material;

disposing the sheet of shrink-film material around an orthopedic cast by connecting the first edge with the opposing second edge with a heat-shrinkable adhesive tape such that the sheet forms a sleeve; and applying sufficient heat to cause the shrink-film material to contract and engage the orthopedic cast.

* * * * *